Thomas Roddick's & James Lockhead's
Self-oiler and Antifrictional bearing.

No. 120,213.  Patented Oct. 24, 1871.

Witnesses:
Mauritz Andrén
Axel Vogt

Inventors:
Thomas Roddick & James Lockhead
by their attorney Allan Andrén

UNITED STATES PATENT OFFICE.

THOMAS RODDICK, OF STRANRAER, AND JAMES LOCKHEAD, OF GLASGOW, SCOTLAND.

IMPROVEMENT IN LUBRICATORS AND ANTI-FRICTION BEARINGS.

Specification forming part of Letters Patent No. 120,213, dated October 24, 1871; antedated October 11, 1871.

*To all whom it may concern:*

Be it known that we, THOMAS RODDICK, of Stranraer, in the county of Wigtonshire, in Scotland, and JAMES LOCKHEAD, of Glasgow, in the county of Lanarkshire, also in Scotland, have jointly invented certain Improvements on Self-Oiler and Anti-Frictional bearings for shaftings, &c., of which the following is a specification:

The nature of our invention relates to improvements on bearings for axles, shaftings, &c., for the purpose of oiling said axles, shafts, &c., evenly and automatically during the revolution of said axle; also to prevent too much friction on the lower bearing, as will now be fully shown and described.

Figure 1:
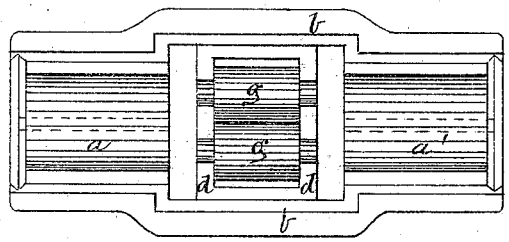
Figure 2:
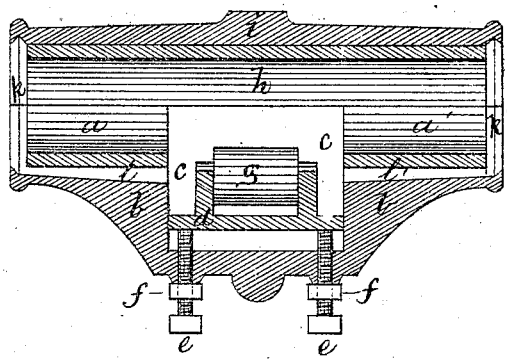
Figure 3:
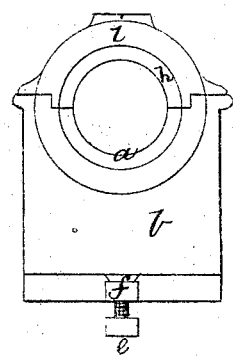
Figure 4:
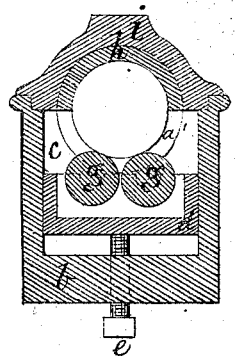

On the drawing, Figure 1 is a ground plan of the bearing with the upper half shown as lifted away; Fig. 2 is a central longitudinal section; Fig. 3 is an end view; and Fig. 4 is a central cross-section of said bearing.

The need has long been felt for a bearing that would distribute the lubricating oil evenly onto the axle, and to return the oil that usually accumulates at the ends of the bearing to the oil-cup again to be used over; also to relieve the friction of the shaft on the lower bearings.

To accomplish these objects is the purpose of our invention, wherefore we construct our bearing as follows: $a\ a'$ are the lower bearings for the shaft, intended to be oiled and supported; the bearings $a\ a'$ rest in a suitable metallic support, $b$, as shown. In the middle of said support $b$ is a cup or receptacle, $c$, filled partially with the oil or lubricating material used. The receptacle $c$ contains also an adjustable frame, $d$, that may be easily adjusted by means of set-screws $e\ e$, having check-nuts $f\ f$, as shown. The frame $d$ forms bearings for two rollers, $g\ g$, that are made to turn easily in their respective bearings. The upper bearing $h$ consists of a continuous bearing, of the same length as the length of the bearings $a\ a'$ and the receptacle $c$ combined together. The bearing $h$ is shown in the drawing as being made of Babbit or other metal; but it may also to advantage be cast in one piece with the cover $i$, if desired. In each extreme end of the metallic cover $i$ and support $b$ are grooves $k\ k'$, into which the oil accumulates that comes out from the ends of the bearing. Under the bearings $a\ a'$ are two channels, $l\ l'$, cut into the support $b$, from the grooves $k\ k'$ and slanting toward the receptacle $c$, as shown. The object of these channels is to return the oil that accumulates in the grooves $k\ k'$ to the receptacle $c$, so as to be used over again without any waste whatever. Our whole arrangement is to be clamped over the shaft for which it is intended to be a bearing, in any common or suitable way.

Our self-oiler operates as follows: Fill the receptacle $c$ with the lubricating material used to about the height of the lower edge of the channels $l\ l'$, and place the frame $d$ with the rollers $g\ g$ therein. The shaft is then laid in the bearings $a\ a'$, and cover $h\ i$ attached. The rollers $g\ g$ are then screwed upward by means of the set-screws $e\ e$, so that they take the position shown in Fig. 4—that is, just touching the shaft that is to be supported. The said shaft, as it rotates, turns the rollers $g\ g$, and, as the rollers are partially immersed in the oil, they conduct a portion of it onto the shaft, which, in its turn, conducts it to the whole upper bearing, from which it comes down on to the lower bearings $a\ a'$. The oil that drips off at the ends of the bearing comes into the grooves $k\ k'$, and is from them conducted through the channels $l\ l'$ back again to the receptacle $c$, so as to be again used by the rollers $g\ g$ in the same manner.

If we desire an anti-frictional bearing we simply screw the frame $d$ and rollers $g\ g$ up a little more, so that the shaft will rest upon the said rollers $g\ g$ without touching the lower bearings $a\ a'$.

The advantages gained with our improved bearing over common ones now in use is, that we save a great deal of lubricating material, as well as labor and time used in oiling the bearings; and we obtain an almost frictionless support for the shaft, as herein described.

Having thus fully described the nature, construction, and operation of our invention, we wish to secure by Letters Patent, and claim—

1. The construction and arrangement of the anti-frictional rollers $g\ g$, movable in the frame $d$ and adjustable by the set-screws $e\ e$, or their equivalents, as fully set forth and described.

2. In combination with the anti-frictional rollers $g\ g$, the grooves $k\ k'$, channels $l\ l'$, and cup $c$, in the manner and for the purpose as fully shown and described.

THOS. RODDICK.
JAMES LOCKHEAD.

Witnesses:
JEREMIAH SULLIVAN,
MICHAEL HARRINGTON.

(87)